United States Patent [19]

Ogino

[11] Patent Number: 4,541,392
[45] Date of Patent: Sep. 17, 1985

[54] FUEL INJECTION CONTROL DEVICE FOR DIESEL ENGINE

[75] Inventor: Shigeru Ogino, Aichi, Japan

[73] Assignee: Toyota Jidosha Kabushiki Kaisha, Toyota, Japan

[21] Appl. No.: 522,213

[22] Filed: Aug. 11, 1983

[30] Foreign Application Priority Data

Aug. 30, 1982 [JP] Japan .................................. 57-150397

[51] Int. Cl.$^4$ ............................................ F02M 59/20
[52] U.S. Cl. ................................. 123/502; 123/198 D; 123/357
[58] Field of Search ........... 123/357, 500, 501, 198 D, 123/198 DB, 358, 502

[56] References Cited

U.S. PATENT DOCUMENTS

| | | | |
|---|---|---|---|
| 4,106,470 | 8/1978 | San Sebastian Saizar ... | 123/198 DB |
| 4,355,621 | 10/1982 | Yasuhara ............................. | 123/501 |
| 4,406,263 | 9/1983 | Leblac ................................. | 123/357 |

FOREIGN PATENT DOCUMENTS

| | | | |
|---|---|---|---|
| 55-156220 | 12/1980 | Japan ................................... | 123/357 |
| 57-32027 | 2/1982 | Japan ................................... | 123/357 |

*Primary Examiner*—Carl Stuart Miller
*Attorney, Agent, or Firm*—Cushman, Darby & Cushman

[57] ABSTRACT

A fuel injection control device suited to use in automotive diesel engines. The device comprises sensors for producing signals upon sensing various states of operation of the engine, including a temperature sensor adapted to produce a temperature signal upon sensing the temperature of a coolant for cooling the engine, a first arithmetic operation means for determining the rate of fuel injection in accordance with the signals delivered by the sensors, and a second arithmetic operation means for determining the timing of fuel injection in accordance with the signals delivered by the sensors. The control device further comprises a first temperature judging means for comparing the coolant temperature signal with a predetermined reference temperature to judge whether the coolant temperature exceeds the reference temperature, an fuel injection rate corrrecting menas for effecting a subtractive correction of the fuel injection rate determined by the first arithmetic operation means, and a timing correcting means for advancing the fuel injection timing determined by the second arithmetic operation means. When the coolant temperature exceeds the reference temperature, the fuel injection rate correcting means and the injection timing correction means operate to decrease the fuel injection rate and to advance the fuel injection timing, respectively.

8 Claims, 10 Drawing Figures

FUEL INJECTION CONTROL DEVICE FOR DIESEL ENGINE

BACKGROUND OF THE INVENTION

The present invention relates to a fuel injection control device for diesel engines. More particularly, the invention is concerned with a fuel injection control device for automotive diesel engines, capable of preventing overheating of diesel engine, in spite of generally inferior cooling condition, without substantially impairing the running performance of the automobile and without requiring suspension of operation of auxiliary equipments such as air conditioner driven by the engine.

Diesel engines generally exhibit a high thermal efficiency thanks to a high compression ratio, but the thermal efficiency is not so high in the full-load operation. Unfortunately, it is becoming difficult to find sufficient space in the engine room for mounting cooling system including a radiator for automotive diesel engine, due to current tendency such as mounting of a supercharger or turbocharger for increasing the engine output for a given engine displacement, slanting of the nose or front end of the automobile for improving the aerodyamical performance of automobile, and so forth. Therefore, the diesel engines are apt to be overheated due to insufficient cooling particularly in current automobiles.

Various proposals have been made hitherto for overcoming the problems concerning insufficiency of the cooling. For instance, in some diesel engines, the rate of fuel injection, i.e. the rate of delivery of fuel from a fuel injection pump to fuel injection nozzles, is decreased when the temperature of a coolant for cooling the engine is raised to a predetermined temperature, thereby to prevent overheating of the engine. It has been proposed also to stop the operation of air conditioner connected to the engine when the predetermined coolant temperature is reached.

These measures, however, suffer from the following disadvantages. Namely, if the rate of fuel injection is decreased, the output power of the engine is also decreased to reduce the speed of the automobile particularly when the latter is running along an ascending slope. In the worst case, the automobile may become unable to ascend the slope. On the other hand, the suspension of operation of the air conditioner inconveniently raises the air temperature in the automobile to impose an uncomfortable feel on the driver and passengers.

SUMMARY OF THE INVENTION

Accordingly, an object of the invention is to provide a fuel injection control device for diesel engines which can prevent overheating of the diesel engine without being accompanied by a reduction in the engine output power and without necessitating suspension of operation of air conditioner and other equipments driven by the engine.

According to the invention, there is provided a fuel injection control device for diesel engines in which the overheating of the engine is prevented by decreasing the fuel injection rate and any reduction in the output power of the engine is compensated for by advancing the timing of the fuel injection.

Namely, the invention provides a fuel injection control device for diesel engines in which, when the temperature of the coolant for cooling the engine is raised to a predetermined temperature, the rate of delivery of fuel from a fuel pump to injection nozzles is decreased and, at the same time, the timing of fuel injection is advanced to compensate for a reduction in the engine output power due to the decrease of the rate of fuel injection.

To this end, according to the invention, there is provided a fuel injection control device for diesel engines comprising: sensors for producing signals upon sensing various states of operation of the engine, the sensors including a temperature sensor adapted to produce a temperature signal upon sensing the temperature of a coolant for cooling the engine; a first arithmetic operation means for performing an arithmetic operation to determine the rate of fuel injection in accordance with the signals delivered by the sensors; a second arithmetic operation means for performing an arithmetic operation to determine the timing of fuel injection in accordance with the signals delivered by the sensors; a first temperature judging means for comparing the coolant temperature represented by the temperature signal with a predetermined reference temperature to judge whether the coolant temperature exceeds the reference temperature; an injection rate correcting means for effecting a subtractive correction by a predetermined amount from the fuel injection rate determined by the first arithmetic operation means; a timing correcting means for advancing by a predetermined angle the fuel injection timing determined by the second arithmetic operation means; and a fuel injection pump for pressurizing a fuel and to deliver the pressurized fuel to injection nozzles; whereby, when the coolant temperature is judged by the first temperature judging means as exceeding the reference temperature, the delivery of the fuel from the fuel pump to the injection nozzles is made at a rate corrected by the injection rate correcting means and at a timing corrected by the timing correcting means.

The above and other objects, features and advantages of the invention will become clear from the following description of the preferred embodiment taken in conjunction with the accompanying drawings.

DESCRIPTION OF THE PREFERRED EMBODIMENT

A preferred embodiment of the invention will be described hereinunder with reference to the accompanying drawings.

Figure 1:
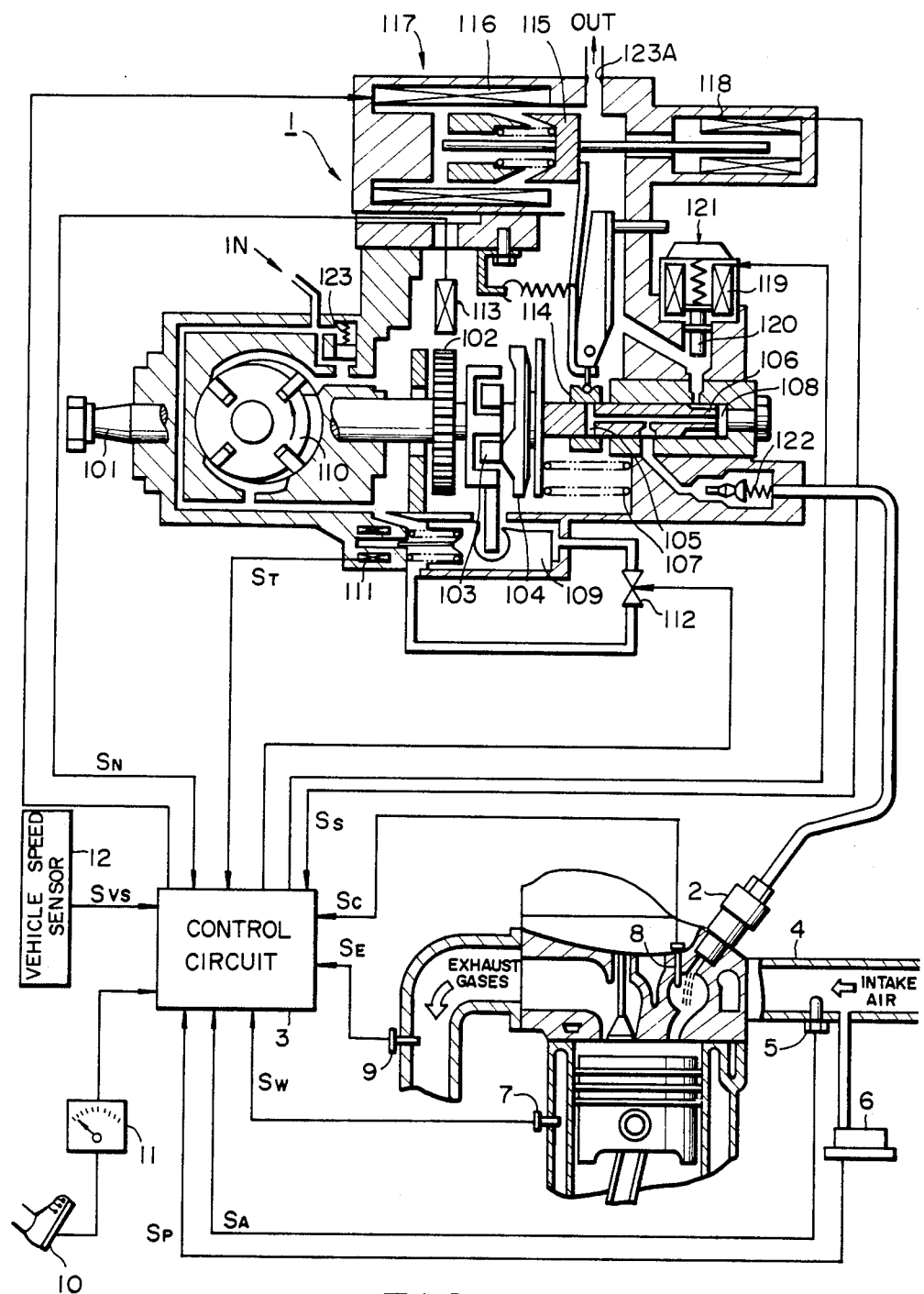
FIG. 1 diagrammatically shows the construction of a fuel injection control device in accordance with the invention.

Referring first to FIG. 1 diagrammatically showing an embodiment of the invention, a fuel injection pump 1 has a drive shaft 101 adapted to be driven by an engine. The drive shaft 101 carries at its one end a gear 102 and a roller 103. A cam plate 104 is loosely coupled to the roller 103. A plunger 106 is provided therein with a spill port 105 and is connected to the cam plate 104 so as to pressurize and deliver a fuel to injection nozzles 2 mounted on the engine. The cam plate 104 and the plunger 106 are normally biased to the left as viewed in FIG. 1 by springs 107. The fuel injection pump 1 further has a fuel pump 110 which is adapted to deliver the fuel to a high-pressure chamber 108 and to a chamber in which a timer piston 109 is provided. The position of the timer piston 109 is electrically detected by a timer position sensor 111. The fuel injection pump 1 further has a timing control valve 112 adapted to determine the advance angle, and an electromagnetic pickup sensor 113 as a rotation speed sensor which produces pulses in accordance with the speed of rotation of the gear 102. The fuel injection rate is changed by a spill ring 114 slidably fitting on the outer peripheral surface of the plunger 106. The spill ring 114 is adapted to be driven by a linear solenoid 117 which is composed of a plunger 115 connected to the spill ring 114 and a solenoid coil 116. The position of the spill ring 114 is detected by a spill position sensor 118. The supply of the fuel to the high-pressure chamber 108 is controlled by a fuel cut-off solenoid valve 121 which is composed of an exciting coil 119 and a valve 120. A delivery valve 122 is adapted to prevent reversing of fuel supplied by the plunger 106, as well as any drag of the fuel. The pressure of the fuel in the pump is regulated by a regulating valve 123.

In operation, the drive shaft 101 is driven in accordance with the operation of the engine to drive the fuel pump 110. The drive shaft 101 drives also the plunger 106 and the cam plate 104 through the medium of he roller 103. The cam plate 104 and the plunger 106 are moved to the right and left as viewed in FIG. 1 in accordance with the state of contact between the cam surface of the cam plate 104 and the roller 103 which is immovable in the direction of axis of the drive shaft 101. The fuel is introduced into the high-pressure chamber 108 as the plunger 106 is moved to the left and, as the plunger 106 is moved to the right, the fuel is pressurized to a high pressure within the high-pressure chamber 108, and the pressurized fuel is introduced to the injection nozzle 2 through the delivery valve 122. As the plunger 106 is moved to a position where the spill port 105 clears the spill ring 114, the fuel in the high-pressure chamber 108 is allowed to spill through the spill port 105 so that the injection of fuel through the nozzle 2 is ceased. Thus, the rate of injection of fuel is determined by the position of the spill ring 114 which in turn is under the control by the linear solenoid 117. On the other hand, the timing of fuel injection is determined by the position of the timer piston 109. It is possible to control the fuel pressure acting on the timer piston 109 by suitably selecting the opening degree of the timing control valve 112, thereby to permit the control of the fuel injection timing. For instance, in the engine operation at a constant speed, a small opening degree of the control valve 112 is maintained to apply a considerably high pressure to the timer piston 109 thereby to attain a large angle of advance.

The distribution of the fuel to all cylinders is achieved by the rotation of the plunger 106. To explain in more detail in this connection, the plunger 106 is provided in the peripheral surface thereof with distribution ports of a number corresponding to the number of the cylinders and, at each time the protrusion of the cam plate 104 pushes the roller 103, the pressurized fuel is delivered to the nozzle 2 of the corresponding cylinder through the distribution port and via the delivery valve 122. The surplus fuel in the pump is relieved to the outside through an orifice 123.

A control circuit 3 is adapted to receive the following signals representing the states of operation of the fuel injection pump 1 and the operation of the engine itself.

$S_N$: engine speed signal derived from the engine speed sensor 113.

$S_S$: spill position signal derived from the spill position sensor 118.

$S_T$: timer piston position signal derived from the timer position sensor 111.

$S_A$: intake air temperature signal obtained through an intake air temperature sensor 5 provided in the intake manifold 4 of the engine.

$S_P$: intake pressure signal obtained through an intake pressure sensor 6 provided in the intake manifold 4

$S_W$: coolant temperature signal derived from the coolant temperature sensor 7.

$S_C$: chamber temperature signal derived from a chamber temperature sensor 8.

$S_E$: exhaust temperature signal $S_E$ derived from an exhaust gas temperature sensor.

$S_{Acc}$: load signal derived from an acceleration sensor 11 serving as a load sensor which senses the load on the engine from the amount of depression of an acceleration pedal 10.

$S_{VS}$: vehicle speed signal derived from a vehicle speed sensor 12.

Upon receipt of these signals, the control circuit 3 operates to control the linear solenoid 117, solenoid valve 121 and the timing control valve 112, thereby to control the fuel injection rate and the fuel injection timing in accordance with the state of operation of the engine.

More specifically, the arrangement is such that, when a starter switch is turned on, the fuel cut-off solenoid valve 121 is energized to permit the supply of the fuel to the high-pressure chamber 108, whereas, when the starter switch is turned off, the fuel cut-off solenoid valve 121 is de-energized to cut off the supply of the fuel to the high-pressure chamber 108. On the other hand, the linear solenoid 117 is driven by an injection rate control signal from the control circuit 3 thereby to shift the spill ring 114 to a desired position. At the same time, the timing control valve 112 is driven by a timing control signal from the control circuit 3 to take a selected opening degree.

Figure 2:
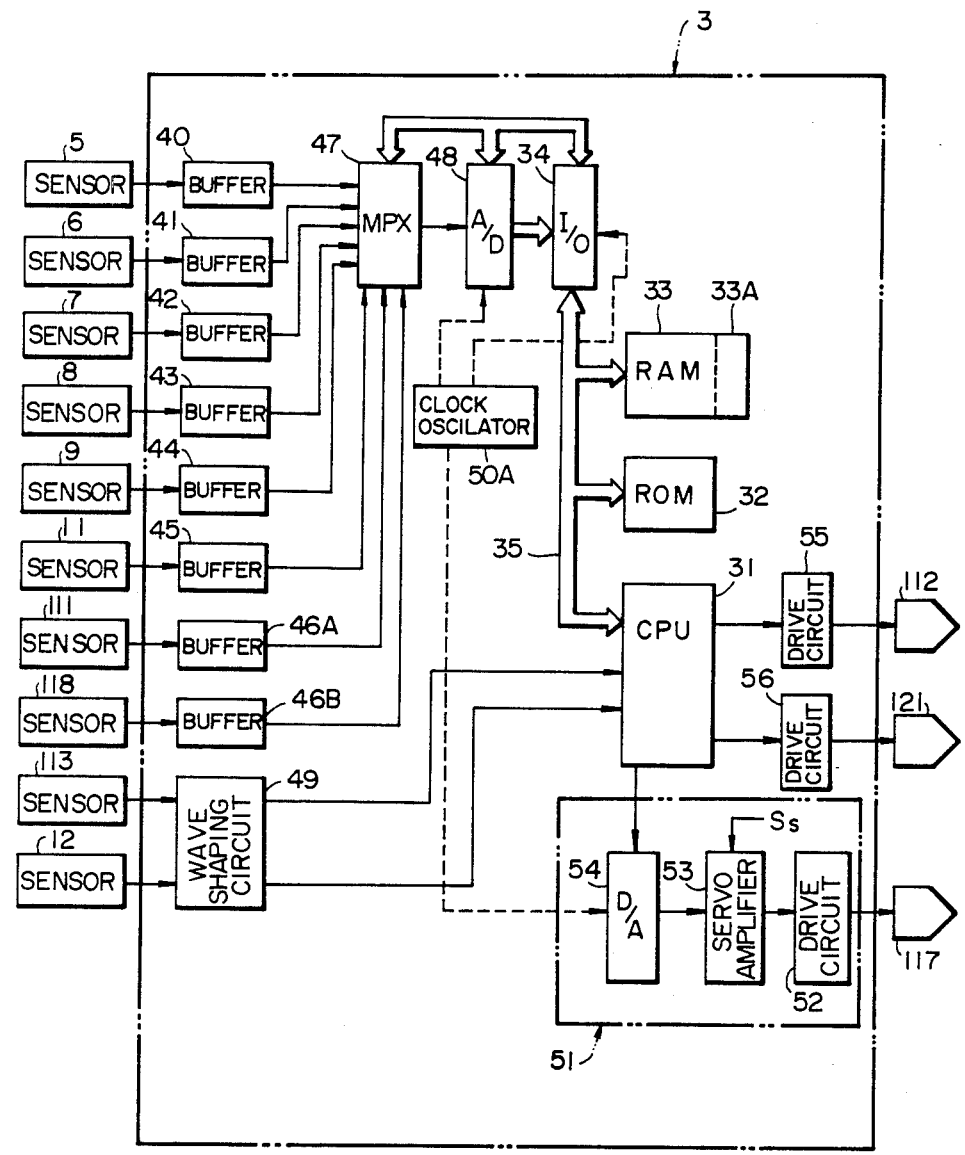
FIG. 2 is a block diagram showing the detail of the control circuit incorporated in the fuel injection control device shown in FIG. 1.
Figure 3:
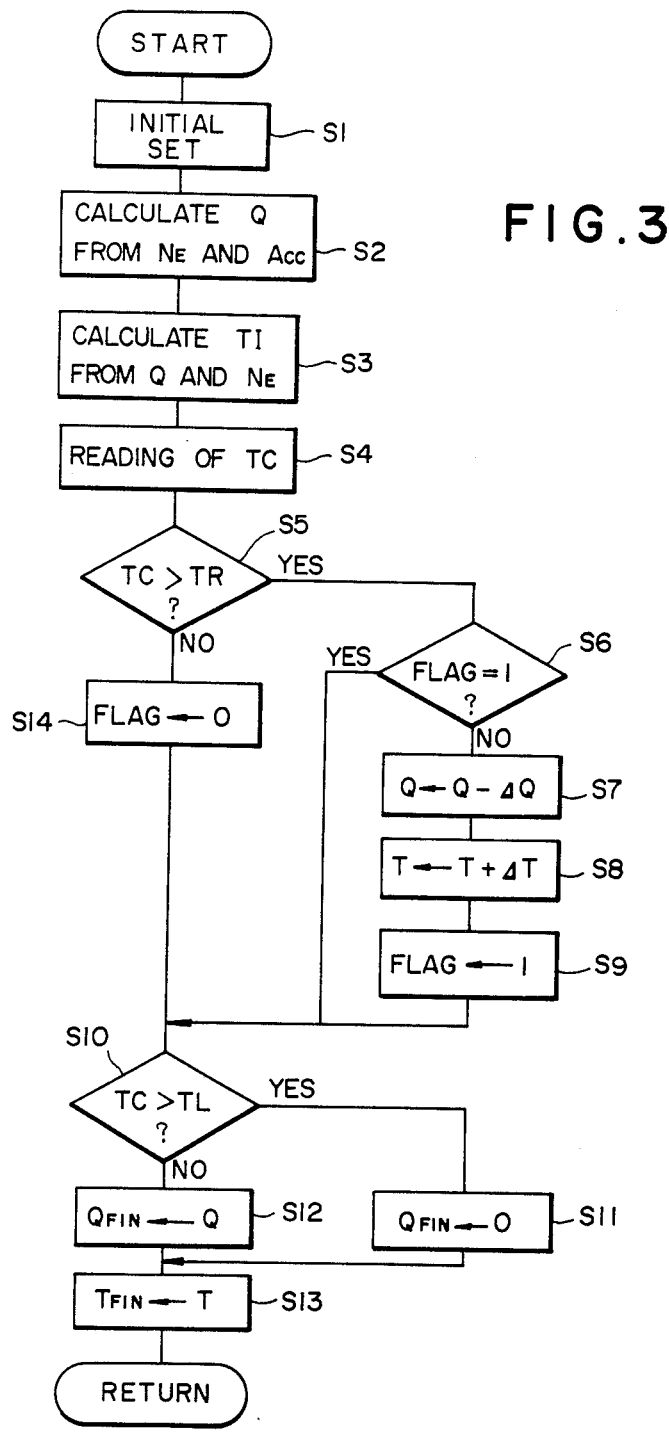
FIG. 3 is a flow chart illustrating the procedure of the fuel injection control performed by the device shown in FIG. 1.

FIG. 2 shows the detail of an example of the control circuit 3 as shown in FIG. 1. The control circuit 3 has an ROM (Read Only Memory) 32 storing various processing programs and monitoring programs, an RAM (Random Access Memory) 33 having a back-up memory 33A adapted to keep the memory of these contents when the electric power supply is cut-off and temporarily storing the contents of arithmetic operations and the contents of outputs from respective sensors, and an input circuit 34. The ROM 32, RAM 33 and the input circuit 34 are connected through a BUS line 35 to a CPU (Central Processing Unit) 31. Thus, the ROM 32, RAM 33, input circuit 34 and the CPU 31 in combination constitute a kind of microcomputer.

The sensors 5,6,7,8,9,11,111 and 118 issue their outputs in the form of analog signals which are delivered to an MPX (multiplexer) 47 through buffers 40,41,42,43,44, 45, 46A and 46B. One of these signals as desired is selected through the MPX 47 and is delivered to an A/D converter (Analog-to-Digital converter) 48 connected to the MPX 47. The A/D converter converts the analog signal from the MPX 47 into a digital signal and delivers the latter to the input circuit 34. The engine speed signal $S_N$ from the engine speed sensor 12 and the vehicle speed signal $S_{VS}$ from the vehicle speed sensor 12 are delivered to the CPU 31 through a wave shaping circuit 49.

The CPU 31 delivers a control signal to a driving circuit 51 for driving injection rate control actuator, thereby to control the fuel injection pump 1. The actuator driving circuit 51 includes a driving circuit 52 for driving the linear solenoid 117, a servo amplifier 53 for delivering a driving signal to the driving circuit 52, and a D/A converter (Digital-to-Analog converter) 54 which is adapted to convert the digital signal from the CPU 31 into analog signal and to deliver the later to the servo amplifier 53. The servo amplifier 53 is adapted to produce a driving signal in accordance with two signals applied thereto: namely, the analog signal $S_S$ from the spill position sensor 118 and the analog signal from the D/A converter 54.

The driving circuits 55 and 56 are connected at their one ends to the CPU 31 and at their other ends to the timing control valve 112 and the fuel cut-off solenoid valve 121, respectively. A reference numeral 50A designates a clock oscillator.

An explanation will be made hereinunder as to how the fuel injection control is performed by the fuel injection control device of the invention, with reference to FIGS. 3 through 10.

Figure 4:
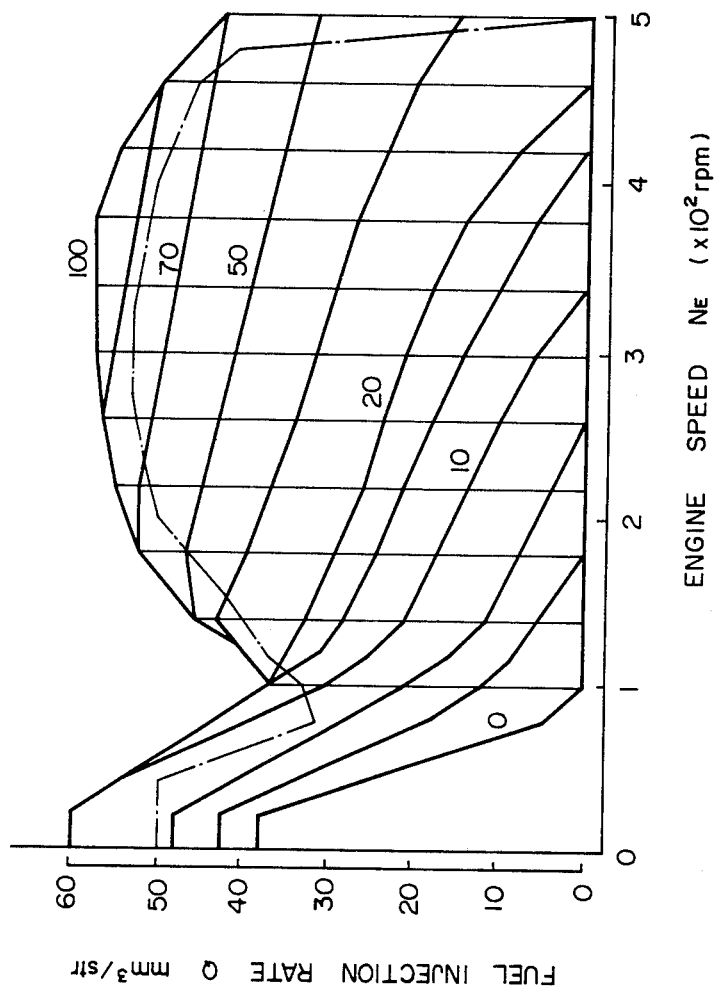
FIG. 4 is a graph showing an example of patterns of fuel injection.
Figure 5:
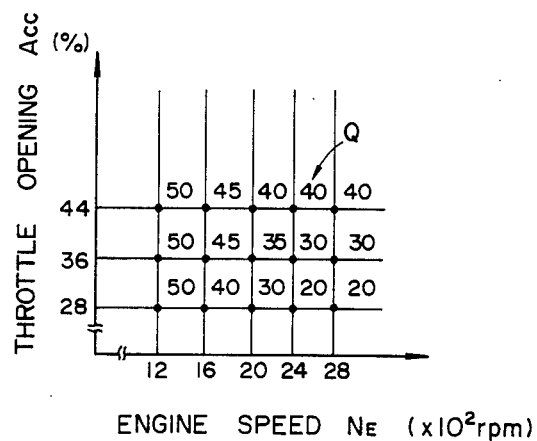
FIG. 5 is a chart used in the determination of the fuel injection rate.
Figure 6:
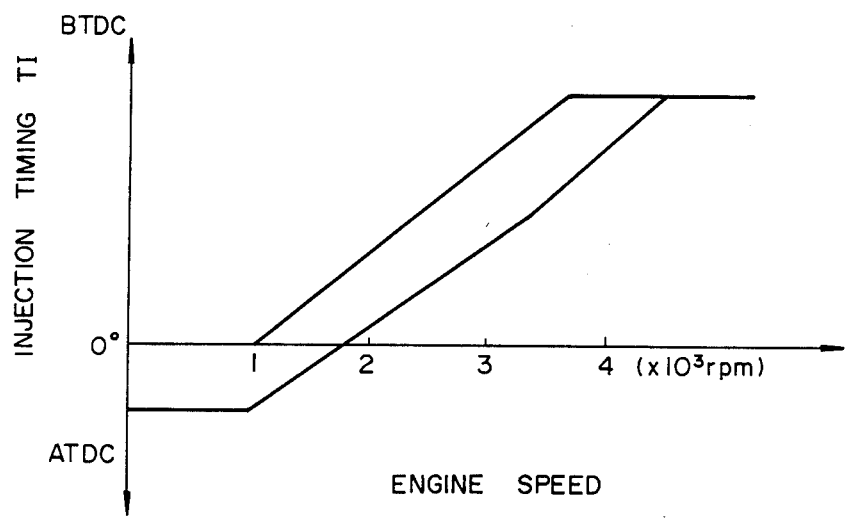
FIG. 6 is a graph showing the relationship between the fuel injection timing and the engine rotational speed.
Figure 7:
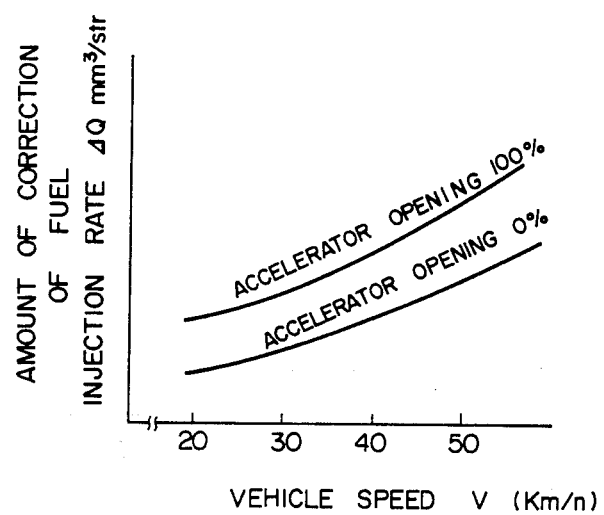
FIG. 7 is a graph showing the amount of correction of fuel injection rate.

The initial setting is made in a first step S1. A step S2 functions as a first arithmetic operation means for determining the fuel injection rate. Namely, in the step S2, the engine speed $N_E$ is read out in the form of the digital engine speed signal $S_N$, while the state of the load on the engine, which is taken up as the accelerator opening degree $A_{CC}$ in the described embodiment, is read out in the form of the digital load signal $S_{Acc}$. With these two digital signals, the CPU determines the fuel injection rate Q from the chart shown in FIG. 5, the chart corresponding to the fuel injection patterns as shown in FIG. 4. A step 3 serve as a second arithmetic operation means for determining the fuel injection timing. Namely, in this step S3, a fuel injection timing TI is determined from the injection timing patterns as shown in FIG. 6, in accordance with the fuel injection rate Q determined in the step S2, taking into account of the engine speed $N_E$. Thus, the timing of the fuel injection is determined within the area as shown in FIG. 6.

In a step 4 which functions as a first temperature judging means, the coolant temperature TC is read in the form of the the digital coolant temperature signal $S_W$. The coolant temperature TC is then compared in a step S5 with a predetermined reference temperature TR which is, for example, 110° C. If the reference temperature TR is exceeded by the coolant temperature TC, a judgement is made in a step S6 as to whether the content of a correction flag is "1". If the content is not "1", the process proceeds to a next step S7 in which the fuel injection rate Q determined in the step 2 is corrected subtractively. The step S7 functions as a fuel injection rate correcting means. Namely, the amount ΔQ of correction of fuel injection rate is represented as a function of the vehicle speed V with a parameter of the accelerator opening $A_{CC}$ and is stored in the form of a chart within the ROM 32. Thus, the correction amount ΔQ is calculated from the load level $A_{CC}$ given in the form of the digital load signal $S_{Acc}$ and the vehicle speed V given as the digital vehicle speed signal $S_{VS}$. Then, an arithmetic operation is made in accordance with a formula (Q−ΔQ) to subtract the correction amount ΔQ from the previously determined fuel injection rate and the thus corrected rate of fuel injection rate Q is used as the new command of the fuel injection rate Q.

Figure 8:
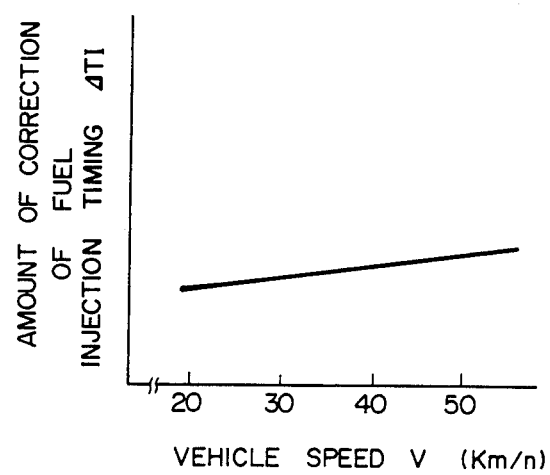
FIG. 8 is a graph showing the amount of correction of the fuel injection timing.

In a step S8 functioning as the timing correcting means, the fuel injection timing TI determined in the step S3 is corrected in the following manner. Namely, the amount ΔTI of correction of timing is given as a function of the vehicle speed V and is stored in the form of a chart within the ROM 32 as shown in FIG. 8. Therefore, the amount ΔTI of correction of fuel injection timing is calculated from this chart by reading the vehicle speed V. Then, an arithmetic operation is made in accordance with a formula (TI+ΔTI) to add the calculated correction amount ΔTI to the injection timing TI determined previously. The result of this addition is used as the new injection timing. Then the process goes to the next step S9 in which "1" is set in the correction flag. The process then proceeds to a next step S10.

The step S10 functions as a second temperature discriminating means for comparing the coolant temperature TC read in the step S4 with a limit temperature TL which is, for example, 115° C. If the coolant temperature TC is higher than the limit temperature TL, the final fuel injection rate $Q_{FIN}$ is set at zero in a step S11. To the contrary, when the coolant temperature TC is still below the limit temperature, the final fuel injection rate $Q_{FIN}$ is set in the step S12 at the same level as the fuel injection rate Q determined previously in the step S7. Then, in a step S13, the injection timing TI determined in the step S8 is adopted as the final injection timing $T_{FIN}$.

The linear solenoid 117 is energized in accordance with the thus determined fuel injection rate Q to move the spill ring 114 to the aimed position and the timing control valve 112 is opened to a degree corresponding to the thus determined fuel injection timing, so that the fuel injection is performed at the aimed rate and timing. It will be understood that, according to the invention, the torque of the engine output is not decreased even though the rate of fuel injection is decreased to lower the temperature of the coolant, i.e. the temperature of the engine, because the timing of the fuel injection is advanced to compensate for any reduction in the output torque which may for otherwise be caused by the decrease of the fuel injection rate.

In the step S5 explained before, when the reference temperature TR of the coolant is not reached by the coolant temperature TC, "0" is set in the flag in step S14, and then the operations of the steps S10, S12 and S13 are executed.

Figure 9:
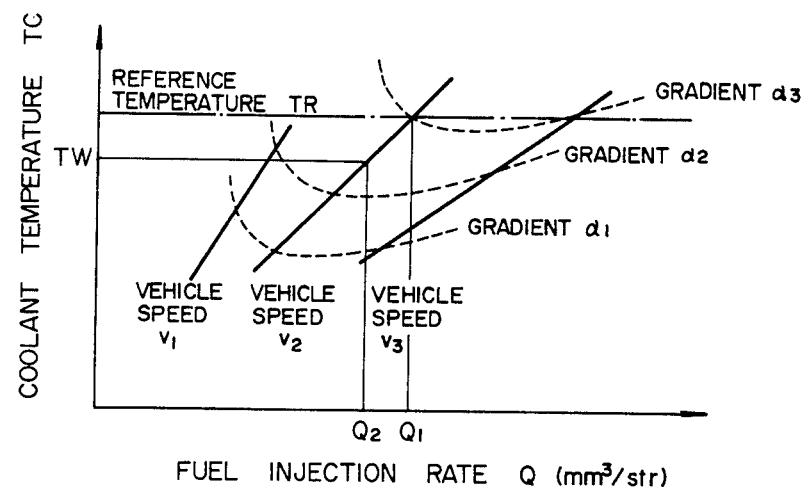
FIG. 9 is a graph showing the relationship between the rate of fuel injection and the temperature of the coolant for cooling the engine.
Figure 10:
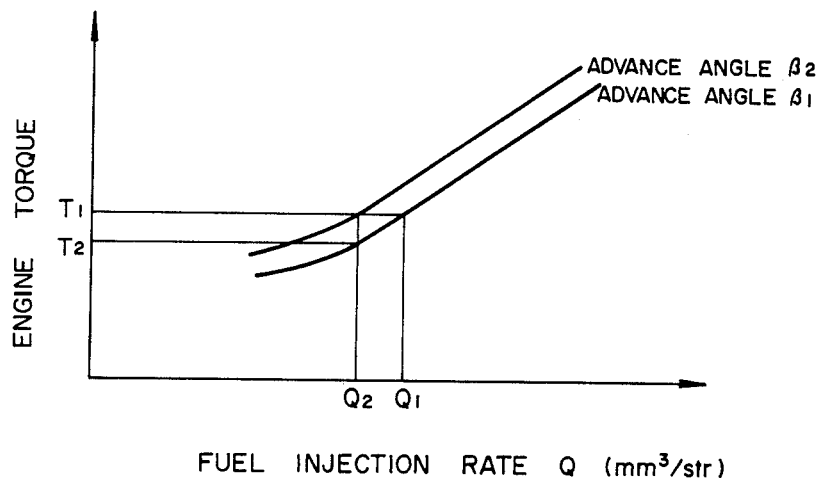
FIG. 10 is a graph showing the relationship between the fuel injection rate and the engine torque.

In FIG. 9, full-line curves show how the coolant temperature is changed in relation to the change in the fuel injection rate, using the vehicle speeds $V_1$ to $V_3$ as parameters, while the broken-line curves show the maximum ascendable gradients of the slopes in relation to the fuel injection rate and the vehicle speed. On the other hand, FIG. 10 shows the relationship established between the fuel injection rate and the engine torque, using the fuel injection timings $\beta_1$ and $\beta_2$ as the parameters. As the vehicle ascends the slope of a gradient $\alpha_3$ at a speed $V_2$, the coolant temperature TC is raised to TR so that the fuel injection rate is decreased from $Q_1$ to $Q_2$ while the fuel injection timing is advanced from $\beta_1$ to $\beta_2$, in accordance with the procedure explained before in connection with FIG. 3. If the advance angle is unchanged from $\beta_1$, the output torque of the engine would be decreased from $T_1$ to $T_2$ as shown in FIG. 10. However, according to the invention, the output torque is maintained at the level of $T_1$ in spite of the reduction of fuel injection rate to $T_1$, because the advance angle is advanced to $\beta_2$. The vehicle, therefore, ascends the slope of the gradient $\alpha_3$ without any substantial retardation from the vehicle speed $V_2$. In this ascending, the fuel injection rate is maintained at the reduced level $Q_2$ so that the coolant temperature is lowered from the reference temperature TR to a lower temperature TW to effectively avoid the overheating of the diesel engine.

As will be fully understood from the foregoing description, the invention provides a fuel injection control device for diesel engines in which, when the coolant temperature is increased to reach or exceed a predetermined reference temperature, the rate of fuel injection is decreased while the injection timing is advanced, so that the overheating of the diesel engine is avoided advantageously.

Although the invention has been described through specific terms, it is to be noted here that the described embodiment is not exclusive. For instance, the construction of the fuel injection pump described and illustrated is only illustrative, and the fuel injection control device of the invention can be embodied with different types of fuel injection pump. Other changes and modifications are still possible within the scope of the invention which is limited solely by the appended claims.

What is claimed is:

1. A fuel injection control device for a diesel engine, comprising:
    sensors for producing signals upon sensing various states of operation of the engine, the sensors including a temperature sensor to produce a temperature signal upon sensing the temperature of a coolant for cooling the engine;
    a first arithmetic operation means for performing an arithmetic operation to determine the rate of fuel injection in accordance with the signals produced by the sensors;
    a second arithmetic operation means for performing an arithmetic operation to determine the timing of fuel injection in accordance with the signals delivered by the sensors;
    a first temperature judging means for comparing the coolant temperature represented by said temperature signal with a predetermined reference temperature to judge whether the coolant temperature exceeds the reference temperature;
    an injection rate correcting means for effecting a subtractive correction by a predetermined amount from the fuel injection rate determined by the first arithmetic operation means when said first temperature judging means judges said coolant temperature exceeds the reference temperature;
    an injection timing correcting means for advancing by a predetermined value the fuel injection timing determined by the second arithmetic operation means when the fuel injection rate is reduced by said injection rate correcting means, said predetermined value corresponding to and compensating for said subtractive correction of the fuel injection rate so as to prevent a decrease in engine output due to said subtractive correction of said final injection rate; and
    a fuel injection pump for pressurizing fuel to deliver the pressurized fuel to injection nozzles.

2. A fuel injection control device for diesel engines according to claim 1, wherein:
    said first arithmetic operation means includes means for calculating the fuel injection rate on the basis of the engine rotational speed and the accelerator opening degree.

3. A fuel injection control device for diesel engines according to claim 1, wherein:
    said fuel injection pump includes:
    a plunger for pressurizing the fuel in a high-pressure chamber and for delivering the pressurized fuel to the injection nozzles of respective cylinders, said plunger having a spill port through which the pressurized fuel is split from said high-pressure chamber so that a delivery of fuel to the nozzles is accomplished,
    a spill ring for opening and closing said spill port,
    a driving device for controlling the positional relationship between said spill ring and said spill port thereby controlling said rate of fuel injection,
    a hydraulic timer for controlling said timing of fuel injection in accordance with the pressure at the discharge side of a fuel feed pump, and
    a timing control valve for controlling the hydraulic pressure applied to said hydraulic timer thereby controlling said hydraulic timer.

4. A fuel injection control device for diesel engines according to claim 3, wherein:
    said driving device includes an exciting coil and a plunger connected to said spill ring, said plunger being displaced in accordance with the level of electric current supplied to said exciting coil thereby moving said spill ring.

5. A fuel injection control device for diesel engines according to claim 1, wherein:
    said injection rate correcting means includes chart means for retaining the amount of correction of the fuel injection rate as a function of the vehicle speed using the accelerator opening as a parameter.

6. A fuel injection control device for diesel engines according to claim 1, wherein:
    said injection timing correcting means includes chart means for retaining the amount of correction of the fuel injection rate as a function of the vehicle speed.

7. A fuel injection control device for diesel engines according to claim 1, further comprising:
    a second temperature judging means for comparing said coolant temperature with a limit temperature which is higher than said reference temperature to judge whether said coolant temperature exceeds said limit temperature; and
    means for reducing said rate of fuel injection to zero when said second temperature means judges that said coolant temperature exceeds said limit temperature.

8. A fuel injection control device for a diesel engine, comprising:

sensors for producing signals upon sensing various states of operation of the engine, the sensors including a temperature sensor for producing a temperature signal upon sensing the temperature of a coolant for cooling the engine;

a first arithmetic operation means for performing an arithmetic operation to determine the rate of fuel injection in accordance with the signals produced by the sensors;

a second arithmetic operation means for performing an arithmetic operation to determine the timing of fuel injection in accordance with the signals produced by the sensors;

a first temperature means for comparing the coolant temperature represented by said temperature signal with a predetermined reference temperature to determine whether the coolant temperature exceeds the reference temperature;

an injection rate correcting means for effecting a subtractive correction by a predetermined amount from the fuel injection rate determined by the first arithmetic operation means when said first temperature means determines said coolant temperature exceeds the reference temperature;

an injection timing correcting means for advancing the fuel injection timing by an amount corresponding to said subtractive correction to compensate for a decrement of engine output caused by said subtractive correction of the fuel injection rate due to the coolant temperature exceeding the reference temperature; and a fuel injection pump for pressurizing fuel to deliver the pressurized fuel to injection nozzles.

* * * * *